United States Patent
Brensinger et al.

(10) Patent No.: US 8,984,814 B2
(45) Date of Patent: Mar. 24, 2015

(54) SINGLE WALL AIRBEAM

(71) Applicant: Nemo Equipment, Inc., Dover, NH (US)

(72) Inventors: Cam Brensinger, Stratham, NH (US); Suzanne Turell, York, ME (US); Connie Yang, York, ME (US)

(73) Assignee: Nemo Equipment, Inc., Dover, NH (US)

( * ) Notice: Subject to any disclaimer, the term of this patent is extended or adjusted under 35 U.S.C. 154(b) by 0 days.

(21) Appl. No.: 13/854,426

(22) Filed: Apr. 1, 2013

(65) Prior Publication Data

US 2014/0004278 A1 Jan. 2, 2014

Related U.S. Application Data

(63) Continuation-in-part of application No. 12/920,702, filed as application No. PCT/US2008/057682 on Mar. 20, 2008, now abandoned.

(60) Provisional application No. 60/895,771, filed on Mar. 20, 2007.

(51) Int. Cl.
*E04G 11/04* (2006.01)
*E04B 1/34* (2006.01)
*E04H 15/20* (2006.01)
(Continued)

(52) U.S. Cl.
CPC .... *B32B 1/08* (2013.01); *B32B 7/02* (2013.01)
USPC ........................................................ 52/2.18

(58) Field of Classification Search
CPC ......... E04H 1/00; E04H 15/00; E04H 15/008; E04H 15/24; E04H 15/32

USPC ............. 52/2.11, 2.13, 2.14, 2.16, 2.18, 2.19, 52/2.21, 2.22, 2.23, 2.25
See application file for complete search history.

(56) References Cited

U.S. PATENT DOCUMENTS

| 4,876,829 | A | | 10/1989 | Mattick | |
| 5,007,212 | A | * | 4/1991 | Fritts et al. | 52/2.18 |
| 5,110,666 | A | * | 5/1992 | Menzel et al. | 428/196 |

(Continued)

FOREIGN PATENT DOCUMENTS

WO      WO 8600952 A1 * 2/1986 .............. E04H 15/20

OTHER PUBLICATIONS

International Search Report for PCT/US08/057682, US PTO, Jun. 4, 2009.

(Continued)

*Primary Examiner* — Mark Wendell
*Assistant Examiner* — Keith Minter
(74) *Attorney, Agent, or Firm* — Bourque and Associates, PA

(57) ABSTRACT

A single wall airbeam constructed of a single layer material including a core of polyester fabric having a coating of adhesive on each surface of the polyester layer. A thin polyester film is applied to one of the adhesive layers. First and second polyurethane layers are applied to the other adhesive layer. The first polyurethane layer is a thicker, higher melt point polyurethane layer that may or may not be coated in a fire retardant material. The second polyurethane layer is a thinner, polyurethane layer having a lower melting point. An airbeam is constructed using one or more pieces of the fabric and heat sealing or welding the one or more polyurethane layers of fabric at seams, when the one or more layers are placed in a confronting position.

6 Claims, 2 Drawing Sheets

(51) Int. Cl.
*B32B 1/08* (2006.01)
*B32B 7/02* (2006.01)

(56) References Cited

U.S. PATENT DOCUMENTS

| | | | | |
|---|---|---|---|---|
| 5,178,938 | A * | 1/1993 | Magistro et al. | 442/261 |
| 5,761,852 | A * | 6/1998 | Liu | 52/2.18 |
| 5,884,646 | A | 3/1999 | Ju | |
| 5,893,237 | A * | 4/1999 | Ryon et al. | 52/2.18 |
| 5,893,238 | A * | 4/1999 | Peacock et al. | 52/2.18 |
| 5,987,822 | A * | 11/1999 | McNiff et al. | 52/2.11 |
| 6,029,404 | A * | 2/2000 | Lewis | 52/2.18 |
| 6,167,898 | B1 * | 1/2001 | Larga et al. | 135/137 |
| 6,192,633 | B1 * | 2/2001 | Hilbert | 52/2.18 |
| 6,239,046 | B1 * | 5/2001 | Veiga et al. | 442/76 |
| 6,260,306 | B1 * | 7/2001 | Swetish et al. | 52/2.18 |
| 6,263,617 | B1 * | 7/2001 | Turcot et al. | 52/2.18 |
| 6,350,709 | B1 * | 2/2002 | Veiga | 442/71 |
| 6,455,449 | B1 * | 9/2002 | Veiga et al. | 442/218 |
| D482,423 | S * | 11/2003 | Newsome | D21/835 |
| 6,641,686 | B1 * | 11/2003 | Veiga et al. | 156/73.1 |
| 6,645,565 | B2 * | 11/2003 | Veiga | 427/407.1 |
| 6,740,607 | B2 * | 5/2004 | Veiga et al. | 442/149 |
| D510,118 | S * | 9/2005 | Smith | D21/834 |
| 7,178,483 | B2 * | 2/2007 | Wu | 119/498 |
| 7,231,739 | B2 * | 6/2007 | Scherba | 52/2.18 |
| 7,543,594 | B2 * | 6/2009 | Novak | 135/116 |
| 7,611,148 | B2 * | 11/2009 | Caswell | 273/400 |
| 7,651,118 | B1 * | 1/2010 | Veiga | 280/728.1 |
| 7,926,225 | B2 * | 4/2011 | Pedretti | 52/2.18 |
| 8,079,182 | B1 * | 12/2011 | Higgins | 52/2.11 |
| 8,166,711 | B2 * | 5/2012 | Lamke | 52/2.18 |
| 8,499,500 | B2 * | 8/2013 | Lamke | 52/2.18 |
| 8,615,966 | B2 * | 12/2013 | Thompson | 52/745.19 |
| 2002/0083653 | A1 | 7/2002 | Hilbert | |
| 2003/0003833 | A1 * | 1/2003 | Kurihara et al. | 442/394 |
| 2004/0042965 | A1 * | 3/2004 | Usui et al. | 424/40 |
| 2004/0261324 | A1 * | 12/2004 | Tewari | 52/2.18 |
| 2008/0001431 | A1 * | 1/2008 | Thompson et al. | 296/187.01 |
| 2008/0190472 | A1 * | 8/2008 | Turcot | 135/126 |
| 2008/0295417 | A1 * | 12/2008 | Turcot | 52/2.13 |
| 2008/0313970 | A1 * | 12/2008 | Turcot | 52/2.18 |
| 2009/0249701 | A1 * | 10/2009 | Turcot | 52/2.18 |
| 2010/0129575 | A1 * | 5/2010 | Veiga | 428/35.4 |
| 2010/0175330 | A1 * | 7/2010 | Turcot | 52/2.11 |
| 2013/0189507 | A1 * | 7/2013 | Yamamoto et al. | 428/219 |
| 2014/0072751 | A1 * | 3/2014 | Bradenburg | 428/41.8 |

OTHER PUBLICATIONS

Written Opinion of International Searching Authority for PCT/US08/057682, US PTO, May 21, 2009.

* cited by examiner

SINGLE WALL AIRBEAM

CROSS-REFERENCE TO RELATED APPLICATIONS

This application is a Continuation-In-part of U.S. patent application Ser. No. 12/920,702 titled "Outdoor Equipment" filed on Sep. 2, 2010 and claims priority from PCT Application PCT/US2008/057682 titled "Outdoor Equipment" filed on Mar. 20, 2008 and U.S. Provisional Application Ser. No. 60/895,771 titled "Outdoor Equipment" which was filed on Mar. 20, 2007, all of which are incorporated fully herein by reference.

TECHNICAL FIELD

The present invention relates to inflatable structures and more particularly, relates to the composition and manufacturing of a single wall airbeam.

BACKGROUND INFORMATION

Air inflated beams (referred to herein as airbeams) are used to create a variety of inflatable recreational structures including tents and other shelters. The materials currently used to make inflatable airbeams are not dimensionally stable in an isotropic manner. Pattern direction and orientation on the fabric used to make the air beams has had a significant impact on the resulting material characteristics. For example, fabrics that stretch on the bias direction need to have a consistent patterning direction and orientation. Although it becomes difficult to closely pack the pattern pieces due to a large amount of waste material, the failure to properly orient a pattern on a sheet or length of material results in airbeams lacking in structural integrity and proper tortional strength when in use.

Prior art designs for inflatable air beams involve a two-layer construction namely, an outer non-resilient, non-air holding sleeve and an inner resilient, air holding bladder such as a polyurethane-inner tube. The air beams that use a double wall construction utilize more material, therefore, the airbeam is heavier than a single-walled airbeam. An additional hindrance with the double wall construction is that the manufacturing processes are more elaborate, including the need to sew sections of fabric and the need to ensure that the direction of the weave of the fabric is aligned precisely with the directions of the cuts made in preparing the fabric sections otherwise the airbeam will twist and distort, thereby adding more costs to the overall structure in addition to significantly added weight.

Accordingly, there is a need for a single wall airbeam and a material capable of being used to make such a single wall airbeam that will allow the low cost manufacture of a single wall airbeam that can be easily manufactured into a lightweight, distortion free airbeam.

SUMMARY

The present invention is an airbeam constructed of a single layer of weldable and air impermeable laminated fabric. The airbeam is cut from one or more pieces of such a single layer fabric material. The airbeam material may include a single piece that is welded or adhered with a single seam, or may include two pieces with two seams, or three or more pieces with additional seams as necessary. The single wall airbeam of the present invention is preferably manufactured from one or two pieces of fabric.

The air impermeable fabric for use in an airbeam is configured with an interior layer and an exterior layer. The fabric comprises a polyester fabric, such as a woven polyester, having a first surface and a second surface. A first adhesive layer is applied to or put in contact with the first surface of the polyester fabric. A polyester film is then applied to or put in contact with the first adhesive layer. The polyester film is configured for forming the exterior layer or exterior surface of the airbeam.

A second adhesive layer is applied to or put in contact with the second surface of the polyester fabric. A first, generally high melt point polyurethane layer is applied to or put in contact with the second adhesive layer. A second, generally low melt point polyurethane layer is applied to or put in contact with the first polyurethane layer. The second, generally low melt point polyurethane layer is configured for forming the interior layer or interior surface of the airbeam.

The fabric layer may include a polyester fabric that is a 50 denier by 70 denier woven polyester fabric. The first, generally high melt point polyurethane layer may be treated with a fire-retardant material. While the second, generally low melt point polyurethane layer may have a melt point of between 200 to 250 degrees Fahrenheit.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
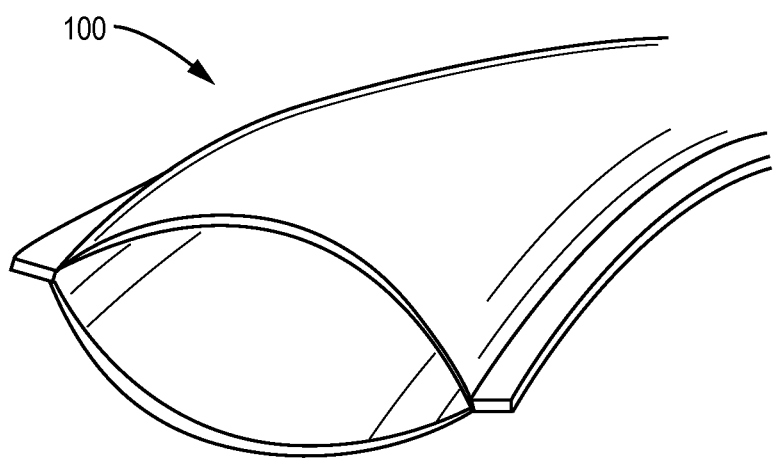
FIG. 1 is a cross-sectional view of a single wall airbeam construction in accordance with the present invention.

The present invention consists of a single-walled inflatable airbeam 100, FIG. 1, which has useful application in a wide variety of applications such as construction of inflatable structures including shelters, tents as well as other structures including, but not limited to, temporary bridges. In particular, the high strength and rigidity of the material used in constructing the airbeam 100 of the present invention allows for the creation of an extremely stable structure because the airbeams constructed of the material of the present invention resist torsional deformation.

Figure 2:
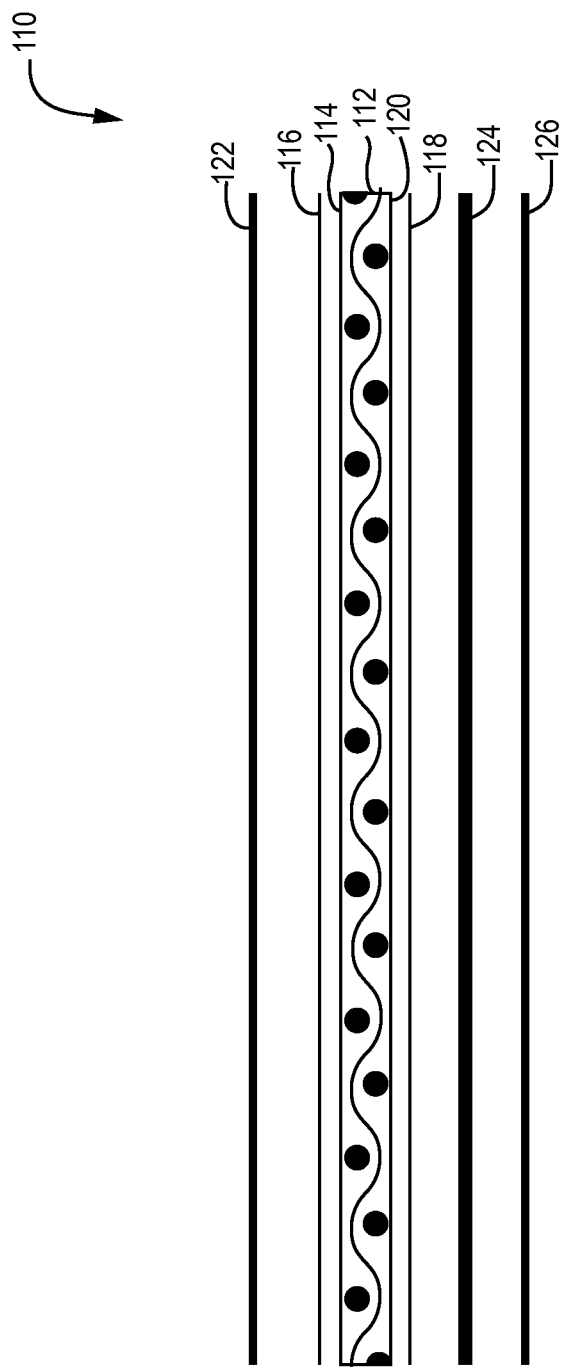
FIG. 2 is a cross-sectional view of a single wall fabric composition according to the present invention.

A preferred embodiment of the fabric used to construct a single wall airbeam 100 according to the present invention is shown generally as 110, FIG. 2. In this embodiment, an airbeam fabric 110 is constructed from a polyester fabric 112 with a top surface 114 and a bottom surface 120. The top surface 114 is coated with a first adhesive layer 116. The first adhesive layer is comprised of a polyester solvent based adhesive or other similar adhesive. The adhesive coating is applied by placing the adhesive in a trough and moving rollers in opposite directions to feed the fabric through, thereby applying adhesive onto the fabric as the fabric is fed through the rollers. Other methods of application are contemplated and within the scope of the present invention. A second adhesive layer 118 is applied similarly to the bottom surface 120 of the polyester fabric 112. The polyester fabric layer 112 is preferably made from 50×70 denier polyester fabric, however the range of deniers can vary from 10 D to 500 D, but other polyesters and other fabrics such as nylons, polypropylenes, nonwovens, and other similar materials are contemplated and within the scope of the present invention.

A polyethylene terephthalate (PET) polyester film layer 122 (more commonly known as Mylar) is applied on the first layer of adhesive 116 and will serve as the "exterior" or visible side of the airbeam fabric 110. Adhesive 116 is first applied to the polyester film layer 122 and then the base fabric 110 and polyester film layer 122 are pressed together under heat and pressure using a roller technique known as nipping. The polyester film layer 122 could also be a polyurethane coating, a laminate, a nylon film, or another similar material. The polyester film layer 122 is preferably about 0.75 mils thick and may be applied by lamination, spray coating, or any other appropriate method and may be colored, printed, etc.

A first polyurethane laminate layer 124 is applied on the second adhesive layer 118. In the preferred embodiment of the invention, the first polyurethane laminate layer 124 is approximately 2 mils thick and is composed of high melt polyurethane material. High melt polyurethanes are characterized by increased heat resistance and anti-stick behavior relative to other thin film polyurethane. The melt temperatures in high melt polyurethanes are generally in the range of 375-430° F. The first polyurethane layer 124 may be applied as a thin film or alternatively, may be applied in one or more coatings. A second polyurethane layer 126 is applied to the lower surface of the first polyurethane layer 124. The second polyurethane layer 126 preferably has a lower melting point than the first polyurethane layer 114 and a thickness of approximately 1.5 mils. The second polyurethane layer 126, which serves as the "interior" layer, may also be treated to be flame retardant in accordance with one or more standards for tents or other products such as standard CPAI-84, the fire retardancy standard for canvas products used in the tenting and camping industry. In the preferred embodiment of the present invention, the second polyurethane layer 126 is approximately 1.5 mils thick and may be applied as a film or by spray coating or by any other appropriate means. The second polyurethane layer 126 may also feature a softening point of approximately 225-250 degrees Fahrenheit, which is the preferred temperature at which the second polyurethane layer 126 becomes weldable.

The purpose of the first polyurethane layer 124 is to serve as an aid to making the airbeam fabric 110 air impermeable. In case either the polyester film layer 122 or the second polyurethane layer 126 have minute air holes, the first polyurethane layer 124 adds another air impermeable layer that in combination with the other mentioned layers, makes the airbeam fabric 110 an air containing member. Although the presently disclosed preferred embodiment describes the use of the first polyurethane layer 124 to aid in air impermeability, this is not a limitation of the present invention as a guarantee of air impermeability may also be accomplished by other methods including, but not limited to, the coating of the polyester film layer 112 with a coating to make the airbeam fabric 110 air impermeable, all without departing from the scope of the present invention.

To construct an airbeam 100 from the airbeam fabric 110 of the present invention, two pieces of airbeam fabric 110 may be heat welded together at each of their respective second polyurethane layers 126 placed face-to-face against one another, for example, at a temperature at which the second polyurethane layer 126 is heated to its softening point thereby "welding" two layers 126 placed face-to-face and heated to the appropriate melting temperature. In a preferred embodiment, the softening point of the second polyurethane layers 126 is approximately 225° F. to 250° F. Sealing of the seams is not limited to welding as various heat sealing and other methods such as ultrasonic bonding, RF welding, and bonding via pressure sensitive adhesives (PSA) are contemplated and within the scope of the present invention.

The multilayer construction of the airbeam fabric 110 of the present invention does not stretch to an appreciable extent and is dimensionally stable in both the length and width direction, and therefore an airbeam constructed using the airbeam fabric 110 according to the present invention resists torsional deformation when inflated and in use. The airbeam fabric 110 of the present invention can be made to resist heat, which also adds to its structural integrity in the presence of differing or increased temperatures.

When layers of the airbeam fabric 110 are joined together, they may be inflated to about 5 to 10 PSI to form a rigid airbeam. This pressure translates to about twenty-five pounds of stress on a seam or about 50 linear lbs.

The process of creating airbeams 100 according to the present invention benefit from greater automation and simpler fabrication compared to processes necessitating sewing or processes which necessitate lining up fabrics used in air bladders in very precise orientation in order to assure good torsional stability when the airbeam is inflated.

The fabric sections used in airbeams of the present invention can be cut by computer numerical control (CNC) cutting machines and the orientation of the polyester weave relative to the direction of the cut is not imperative as it is in other, prior art airbeam fabrics. Neither is the symmetry of the fabric sections nor is the precision of the cuts made to sections of fabric in the present invention imperative.

In yet another aspect of the present invention, sections of airbeams are connected such that air may pass between them. Numerous sections of airbeam may be welded together in a manner allowing the passage of air between them and allowing the connected airbeams to be inflated and deflated using only one valve. Advantageously, connected airbeams of the present invention may be produced from flat, or planar sections of fabric and then may be welded together in orientations that are multiplanar when inflated.

It is contemplated and within the scope of the current invention that an airbeam may be constructed from a single strip of material, such that the single strip of material would be folded over and welded only on the open-edge side to form an airbeam. If this construction was used, the airbeam could only be linear (i.e. straight and without curves). Therefore, it is preferred that the method of constructing an airbeam involves the use of two pieces or strips of airbeam fabric, thereby allowing for both straight and curved airbeam configurations.

Accordingly, the present invention provides a novel, heat sealable and air impermeable fabric structure that is used to construct a single-wall airbeam which is lightweight, free of torsional stresses caused by fabric orientation, and easily welded together to form the airbeam.

Modifications and substitutions by one of ordinary skill in the art are considered to be within the scope of the present invention, which is not to be limited except by the allowed claims and their legal equivalents.

The invention claimed is:

1. An air impermeable non-stretchable multi-layer fabric for use in an airbeam, said multi-layer fabric configured with an interior layer and an exterior layer, said multi-layer fabric comprising:
   a woven, non-stretchable polyester fabric having a first surface and a second surface;
   a first adhesive layer applied in contact with said first surface of said woven non-stretchable polyester fabric;

a polyester film in contact with said first adhesive layer, and configured for forming said exterior layer of said multi-layer fabric;

a second adhesive layer applied in contact with said second surface of said polyester film;

a first polyurethane layer applied in contact with said second adhesive layer, said first polyurethane layer having a predetermined melting point; and a second polyurethane layer applied in contact with said first polyurethane layer, said second polyurethane layer having a predetermined melting point, said predetermined melting point of said second polyurethane layer being less than the melting point of said first polyurethane layer.

2. The non-stretchable multi-layer fabric of claim 1, wherein said polyester film is a 50 denier by 70 denier woven polyester fabric.

3. The non-stretchable multi-layer fabric of claim 1, wherein said first polyurethane layer is treated with a fire-retardant material.

4. The non-stretchable multi-layer fabric of claim 1, wherein said second polyurethane layer has a melt point of between 200 to 250 degrees Fahrenheit.

5. A single wall airbeam manufactured from the non-stretchable multi-layer fabric according to claim 1.

6. An airbeam constructed of a first and second non-stretchable multi-layer air-beam fabric members, said airbeam comprising:

an airbeam having a length and a width, said air-beam defined by a first non-stretchable, multi-layer airbeam fabric member attached to a second non-stretchable, multi-layer airbeam fabric member proximate first and second edges of said first and second non-stretchable multi-layer airbeam fabric members, said first non-stretchable multi-layer airbeam fabric member attached to said second non-stretchable multi-layer airbeam fabric member proximate at least said first and second edges of said first and second non-stretchable multi-layer airbeam fabric members defining an open, internal, air-containing region, each of said first and second airbeam fabric members comprising:

a woven non-stretchable polyester fabric having a first surface and a second surface;

a first adhesive layer in contact with said first surface of said polyester fabric;

a polyester film in contact with said first adhesive layer and configured for forming an exterior layer of said airbeam;

a second adhesive layer in contact with said second surface of said polyester film;

a first polyurethane layer applied in contact with said second adhesive layer, said first polyurethane layer having a predetermined melting point; and a second polyurethane layer applied in contact with said first polyurethane layer, said second polyurethane layer having a predetermined melting point, said predetermined melting point of said second polyurethane layer being less than the melting point of said first polyurethane layer, wherein said first non-stretchable, multi-layer airbeam fabric member is attached using a heating process to said second non-stretchable, multi-layer airbeam fabric member at a confronting interface proximate at least said first, and second edges of said first and second non-stretchable, multi-layer airbeam fabric members between said second polyurethane layer of each of said first and second non-stretchable, multi-layer airbeam fabric member.

* * * * *